United States Patent [19]

Gappa

[11] 4,307,282

[45] Dec. 22, 1981

[54] METHOD OF AND ARRANGEMENT FOR APPLYING INDICIA TO A SURFACE OF A MOVING WORKPIECE

[75] Inventor: Klaus Gappa, Dortmund, Fed. Rep. of Germany

[73] Assignee: Estel Hoesch Werke AG, Dortmund, Fed. Rep. of Germany

[21] Appl. No.: 100,539

[22] Filed: Dec. 5, 1979

[30] Foreign Application Priority Data

Dec. 9, 1978 [DE] Fed. Rep. of Germany ....... 2853258

[51] Int. Cl.³ ................... B23K 26/08; B23K 26/18; G01D 15/10; G01D 15/14
[52] U.S. Cl. .................. 219/121 LJ; 219/121 LH; 219/121 LT; 219/121 LU; 219/121 LW; 346/76 L
[58] Field of Search ............... 219/121 LH, 121 LJ, 219/121 LS, 121 LT, 121 LU, 121 LV, 121 LW, 121 LX, 121 L, 121 LM; 346/76 L

[56] References Cited

U.S. PATENT DOCUMENTS

| | | | |
|---|---|---|---|
| 3,154,371 | 10/1964 | Johnson | 219/121 LX X |
| 3,256,524 | 6/1966 | Stauffer | 219/121 LH X |
| 3,622,740 | 11/1971 | Ravussin et al. | 219/121 LT X |
| 3,803,637 | 4/1974 | Martin et al. | 346/76 L |
| 3,898,417 | 8/1975 | Atkinson | 219/121 LH X |
| 4,060,323 | 11/1977 | Hirayama et al. | 346/76 L X |
| 4,121,595 | 10/1978 | Heitmann et al. | 219/121 LT X |

FOREIGN PATENT DOCUMENTS 54-121249 9/1979 Japan .......................... 219/121 LT

OTHER PUBLICATIONS

*IBM Technical Disclosure Bulletin*, vol. 15 No. 5 Oct. 1972, pp. 1479–1480, "Scanning Method Employing Multiple Flying Spots Per Field" by J. G. Belleson.

*Primary Examiner*—Gene Z. Rubinson
*Assistant Examiner*—Keith E. George
*Attorney, Agent, or Firm*—Max Fogiel

[57] ABSTRACT

To apply indicia to a surface of a traveling workpiece, particularly of a rapidly moving workpiece, a beam of coherent laser light is split to form two rays, one of which is deflected directly onto the surface whereas the other is indirectly guided onto the surface. The two rays form on the surface two parallel indicia which are located opposite one another but are spaced transversely of the direction of workpiece movement.

12 Claims, 5 Drawing Figures

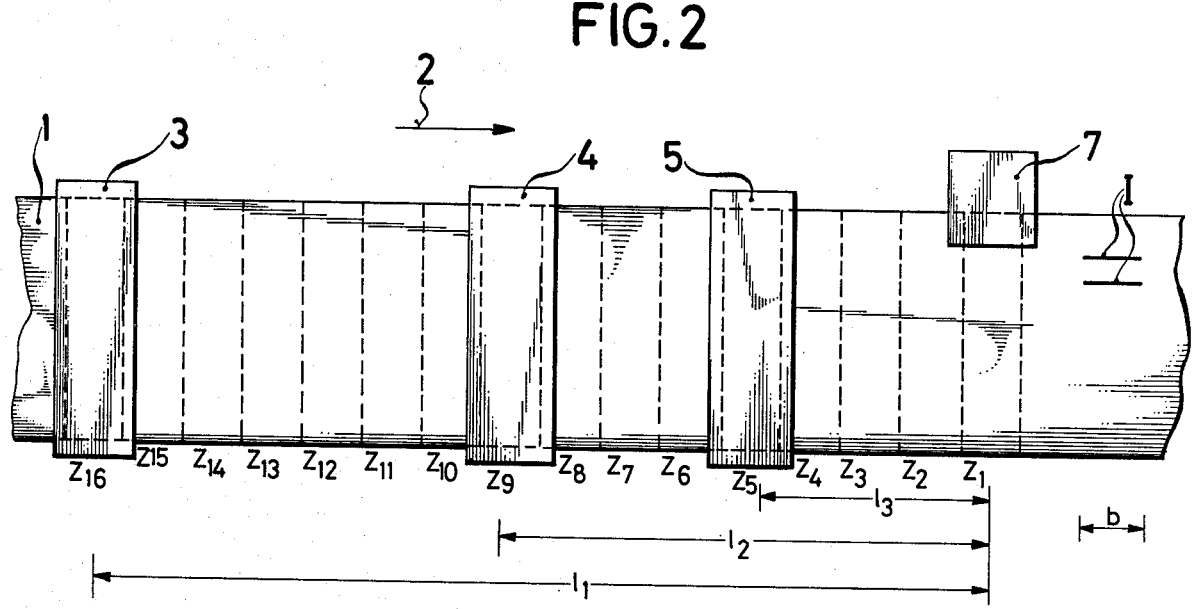
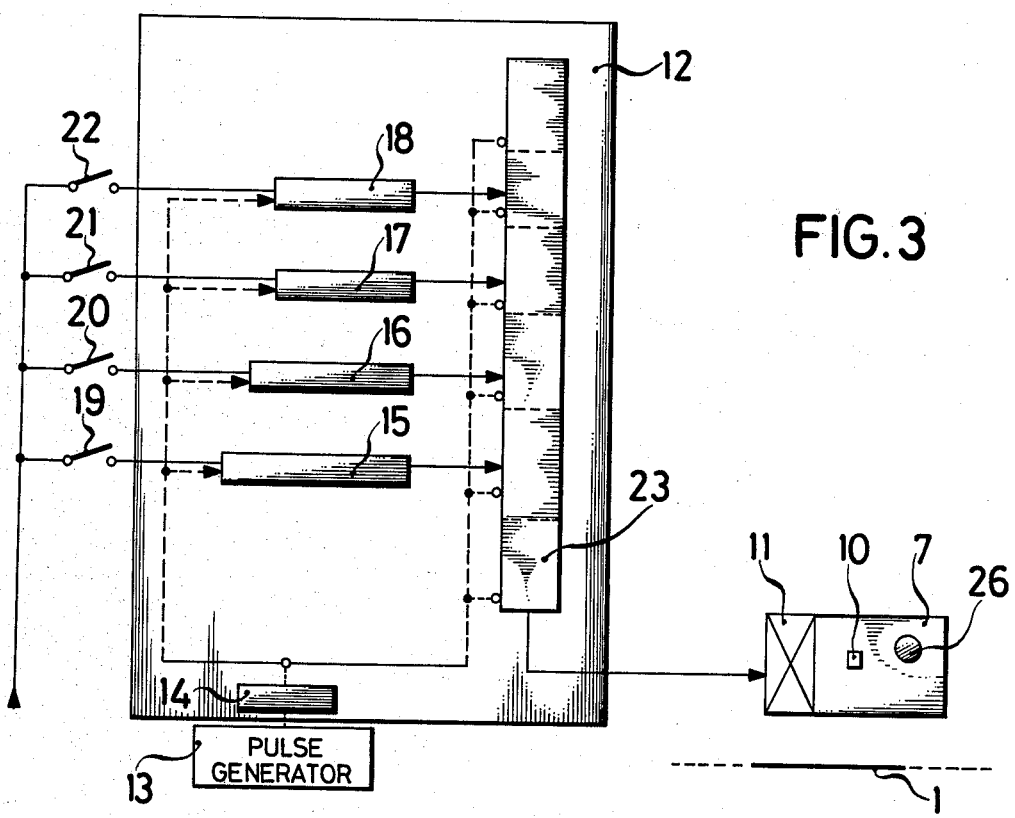

METHOD OF AND ARRANGEMENT FOR APPLYING INDICIA TO A SURFACE OF A MOVING WORKPIECE

BACKGROUND OF THE INVENTION

This invention relates to the application of indicia to workpieces.

More particularly, the invention relates to the application of indicia to a surface of a moving workpiece.

Still more specifically, the invention relates to a method of and an apparatus for applying indicia to a surface of a moving workpiece.

Many types of moving workpieces must be provided with indicia which may be indicative of workpiece batch numbers, workpiece quality or the like. The invention will hereafter be described with respect to the application of indicia to a surface of a moving workpiece, particularly a rapidly moving workpiece such as a metal plate or a metal tape (e.g. a steel plate or steel tape), although it should be understood that the invention is by no means limited to this application.

It has been proposed in Ser. No. 910,277 to subdivide the surface of a workpiece (e.g. a plate or a tape) intermediate an inspection station and an indicia-applying station into zones having a length corresponding to the length of the indicia to be applied, whereupon each individual zone is electronically tracked intermediate the inspection station and the indicia-applying station, and the surface of each of the thus-tracked zones is oxidized and melted by the application of a laser beam from a laser light source. Each of the zones to be tracked is assigned a space in a shift register associated with the inspection station, and according to a preferred embodiment of this prior proposal the items of information from the individual shift registers are supplied to the laser light source simultaneously or sequentially to control the operation of the same, and simultaneously or in timed succession converted into laser-light pulses.

This prior proposal has been found to be highly advantageous in many applications. However, there are certain applications in which a more precise marking of e.g. faults in the tape or plate is necessary or at least desirable. For such applications, a further improvement is necessary.

SUMMARY OF THE INVENTION

Accordingly, it is a general object of this invention to provide the aforementioned desirable improvements.

More particularly, it is an object of this invention to provide an improved method of applying indicia to a surface of a moving workpiece, particularly a rapidly-moving workpiece.

Another object of the invention is to provide an arrangement for carrying the novel method into effect.

A concomitant object of the invention is to provide an improved method of the type under discussion, wherein the items of information present in the individual shift registers (which are used in accordance with the proposal already made in the prior art) are converted into a marking (i.g. indicia) of stripes extending parallel to one another and spaced transversely to the direction of advancement of the workpiece, which stripes are spaced from one another by a defined distance and are to be applied simultaneously with one another.

Pursuant to the above objects, and other objects which will become apparent hereafter, one aspect of the invention resides in a method of applying indicia to a surface of a moving workpiece. Briefly stated, this method may comprise the steps of emitting a laser beam from a source; splitting the laser beam into two rays located in a common plane; and deflecting the rays onto a surface of a workpiece which moves in a predetermined direction so as to form on the surface two parallel indicia which are located opposite one another but are spaced transversely of said predetermined direction.

It is currently preferred to emit the laser beam in a direction parallel to the travel direction of the workpiece and to split it by means of a semi-permeable mirror into the two rays which are focused, the reflected ray or part of the beam being guided parallel to the surface of the workpiece and reflected by means of a light-impermeable mirror, whereupon both rays are then directed against one and the same mirror surface of a mirror system rotating above the workpiece and from there directed to the workpiece surface.

According to an advantageous and, furthermore, simplified embodiment of the invention, it is proposed that the laser beam be directed normal to the surface of the workpiece, be split by means of a semi-permeable mirror into two parts corresponding to the aforementioned rays, and that the part which penetrates the mirror is focussed and thereafter directly guided onto the workpiece surface whereas the reflected part is focussed and is then directed to a turnable mirror from where it is deflected onto the workpiece surface. The axis of turning of the mirror should extend parallel to the direction of advancement of the workpiece.

According to a currently preferred embodiment of an arrangement for carrying out the method, a mirror system is mounted above the path of movement of the workpiece so that it can rotate, and is provided with indentically-dimensioned mirror strips mounted on its circumference. A laser beam is directed towards this mirror system and interposed in its path is a semipermeable mirror which permits one part of the laser beam to pass through it whereas the remainder of the laser beam is reflected parallel to the surface of the workpiece. In the path of this remainder portion of the beam there is arranged a light-impermeable mirror which can be turned by a drive about an axis normal to the surface of the workpiece, and intermediate these mirrors and the mirror system there is arranged, in the path of each of the portions of the split beam, a respective focussing lens.

The invention will hereafter be described with reference to the appended drawings which show an exemplary embodiment of the invention. It should be understood, however, that these illustrations and the descriptions thereof are by way of example only and that the invention itself is authoritatively defined in the appended claims.

BRIEF DESCRIPTION OF THE DRAWING

FIG. 2 is a top-plan view of a portion of a strip-shaped workpiece showing how this portion is subdivided into zones to be tracked;

FIG. 3 is a function diagram illustrating the operation of an arrangement according to the invention;

DESCRIPTION OF PREFERRED EMBODIMENTS

Figure 1:
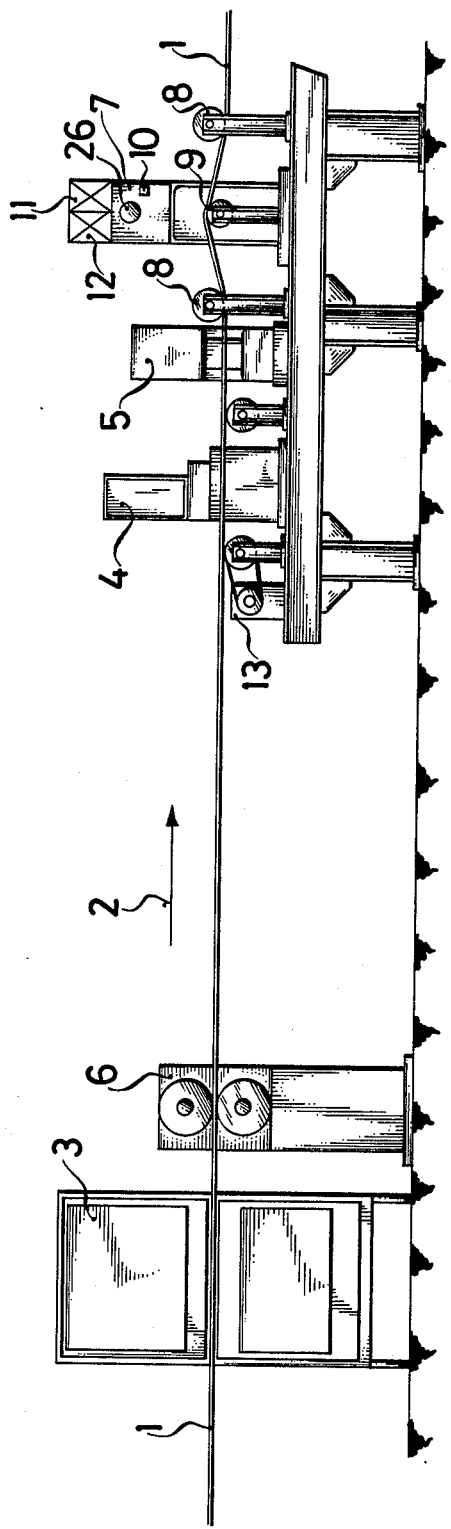
FIG. 1 is a somewhat digrammatic side-elevational view, illustrating an embodiment of an arrangement for carrying out the invention.

Referring firstly to FIG. 1 it will be seen that a tinned workpiece in form of a strip 1 travels in the direction of an arrow 2, coming from a not-illustrated tinning installation and moving towards an inspection station 3 in which it is inspected for surface faults. Having passed the inspection station 3 the strip 1 then passes sequentially through additional inspection stations 4 and 5, of which the former inspects it for the presence of holes and the latter inspects it for the presence of thickness-tolerance variations. A nip-roller pull-off 6 is located downstream of the station 3 and pulls the tape 1 out of the tinning station and advances it to the inspection stations 4 and 5.

Immediately downstream of the inspection station 5 there is provided an indicia-applying station 7 through which the tape 1 is guided via rollers 8 and 9. The station 7 has a laser light source and a laser head 10 which guides the laser beam, as well as a laser-beam control 11. This control 11, which causes the application of indicia to the surface of the traveling tape 1 by oxidizing melting a portion of the surface, receives its operating impulses from the electronic device 12 which will be described later with respect to FIG. 3.

The laser beam produced by the laser light source (this is known per se in the art) is directed via the laser head 10 onto the tape 1 and applies indicia to the tape 1 in accordance with the items of information derived from the inspection stations 3, 4 and 5. Once the tape 1 has been marked, it is taken up on a not-illustrated take up roller or the like. It will be appreciated, of course, that the marking can also be applied to the tape 1 before it is severed in a severing device into tape sections (rather than being taken up on a take-up roller) or immediately after it has been severed into individual sections.

FIG. 2 shows a portion of the traveling tape 1 which moves in the direction of the arrow 2 through the inspection stations 3, 4 and 5 in sequence. As the tape 1 travels in this direction, it is electronically (but not physically) subdivided into zones Z by means of a pulse generator 13 (see FIG. 3) which is synchronized with the speed of advancement of the tape. The pulse generator 13 produces pulses of identical duration and timed spacing, so that e.g. 10 pulses correspond to a path of travel of 60 mm. These pulses are supplied to a counter 14 which counts them and subdivides the counted pulses into groups of e.g. 10 pulses, so that according to FIG. 2 the zones Z-1 to Z-16 are obtained, having a length corresponding to the length of the indicia to be applied and being electronically produced between the inspection station 3 and the indicia-applying station 7.

At the end of each group of 10 pulses, i.e. at the end of each of the zones Z, the counter 14 produces a shifting pulse which is supplied to the shift registers 15–18 that are shown in FIG. 3. These shift registers have storage locations and are each assigned to a particular type of information. For example, the shift register 15 may have assigned to it the information supplied by the station 3 relative to detected surface faults of the tape 1, the shift register 16 may be assigned the information produced by the station 4 relative to holes detected in the tape 1, and the shift registers 17 and 18 may have assigned to them information produced by the station 5 relative to thickness deviations which have been detected from the preselected thickness value.

When a shifting pulse is produced, the storage location associated in each of the shift registers 15–18 with one of the zones Z-1 to Z-16 is shifted by one place in the direction towards the outlet or end of the respective shift registers 15–18. In parallelism with this shifting a certain zone Z of the actual tape 1 travels through the inspection stations 3, 4 and 5. If, now, a fault is detected in e.g. the inspection station 3, this station produces a pulse to the storage location which is kept free in the shift register 15 for this particular zone Z. Analagous pulses are supplied by the inspection stations 4 and 5 to the storage locations in the shift registers 16, 17 and 18.

The inspection stations 3, 4 and 5 are provided with contacts 19–22 which briefly engage when a fault is detected, thus completing a circuit and producing the pulse for one of the storage locations in the corresponding shift registers 15–18, respectively.

Figure 4:
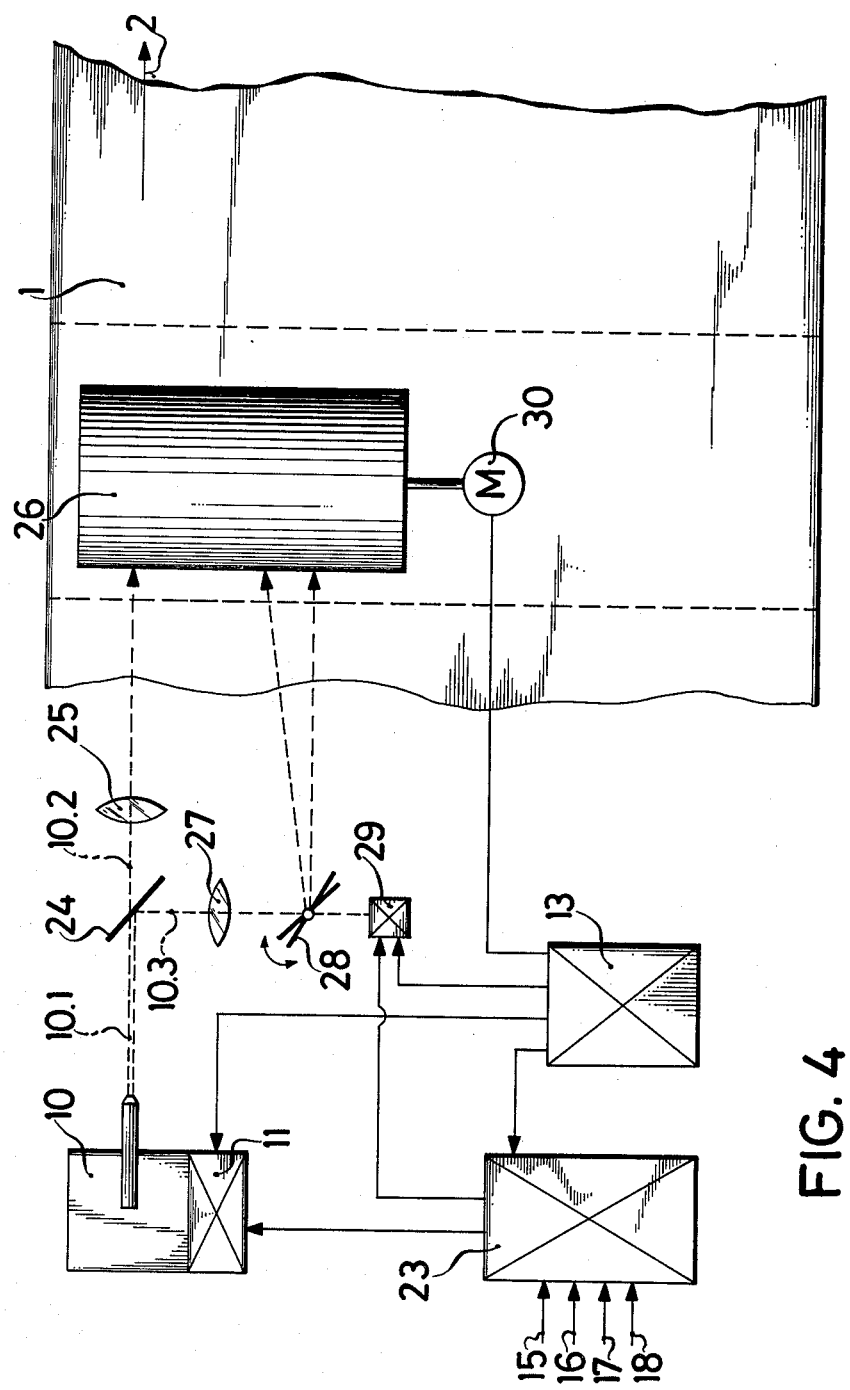
FIGS. 4 and 5 each provide a diagrammatic illustration of the inventive arrangement.

After the particular zone Z has traveled through all of the inspection stations 3–5 it arrives at the indicia-applying station 7. In parallelism with this movement, the storage locations associated with this particular zone Z in the shift registers 15–18 (and the indications of detected faults which have been inscribed in the storage locations) have reached the ends of these shift registers. The fault indications stored in the individual shift registers 15–18 and belonging to a particular zone Z, are preferably processed in that the individual shift registers 15–18 are classified according to preselected priorities in an electronic device 23 and that each zone has associated with it only the information having the highest priority, as shown in FIG. 4.

In that figure, it will be seen that the arrangement for producing parallel marking strips or indicia is arranged above a portion of the strip 1. The laser head is identified again with reference numeral 10 and is arranged with its control 11 in such a manner that the emitted laser beam 10.1 extends parallel to the direction of movement (see arrow 2) of the tape 1 and impinges upon a mirror 24 which is semi-permeable to this beam. The portion 10.2 of the beam 10.1 which passes through the mirror 24 travels to a focussing lens 25 which focusses it and directs it to a mirror system 26. The portion 10.3 of the beam which is reflected by the mirror 24 is reflected in direction parallel to the surface of the tape 1 and travels through a further lens 27 which focusses it and directs it to a light-impermeable mirror 28. The latter is mounted so that it can be driven via a drive 29 about an axis extending normal to the surface of the tape 1 and, when impinged by the portion 10.3 of the laser beam 10.1, it reflects this portion 10.3 onto the mirror system 26.

Thus, both the portion 10.2 and the portion 10.3 of the laser beam 10.1 are directed onto one and the same mirror surface of the mirror system 26 which then reflects them onto the surface of the tape 1. The mirror system 26 itself is composed of a wheel on the circumference of which there are mounted circumferentially spaced identically wide and identically long mirror strips; this wheel is driven by a stepper motor 30.

The pulse generator 13 which controls the shift registers 15–18 has the additional purpose of synchronizing the shift registers 15–18 with the laser light pulse, with the rotation of the mirror 28 and the drive of the stepper motor 30 of the mirror system 26. This is effected in that a shifting pulse issued by the pulse generator 13 causes the information having the highest priority from the electronic drive 23 to be supplied to the control for the drive 29 of the turnable mirror 28 which as a result of this is set to a specifically defined angle. After a brief time lapse, but always in synchronism, the laser light source with the head 10 and the stepper motor 30 of the mirror system 26 are activated. The stepper motor 30 is activated in such a manner that it turns the mirror system 26 to a position in which it is assured that the parallel beam rays 10.2 and 10.3 of the laser beam 10.1 will always impinge under the same angle upon the mirror surfaces of the mirror system 26 from where they are reflected to the surface of the tape 1. Due to the rotation of the mirror system 26 oxidation respectively melting of portions of the surface of the tape 1 results in the production of two parallel strip-shaped markings on this surface, and the spacing of these parallel markings from one another corresponds to the information of the highest priority mentioned above. In other words, this spacing is a function of the type of information involved and conveys this information as a function of the magnitude of the spacing.

Figure 5:
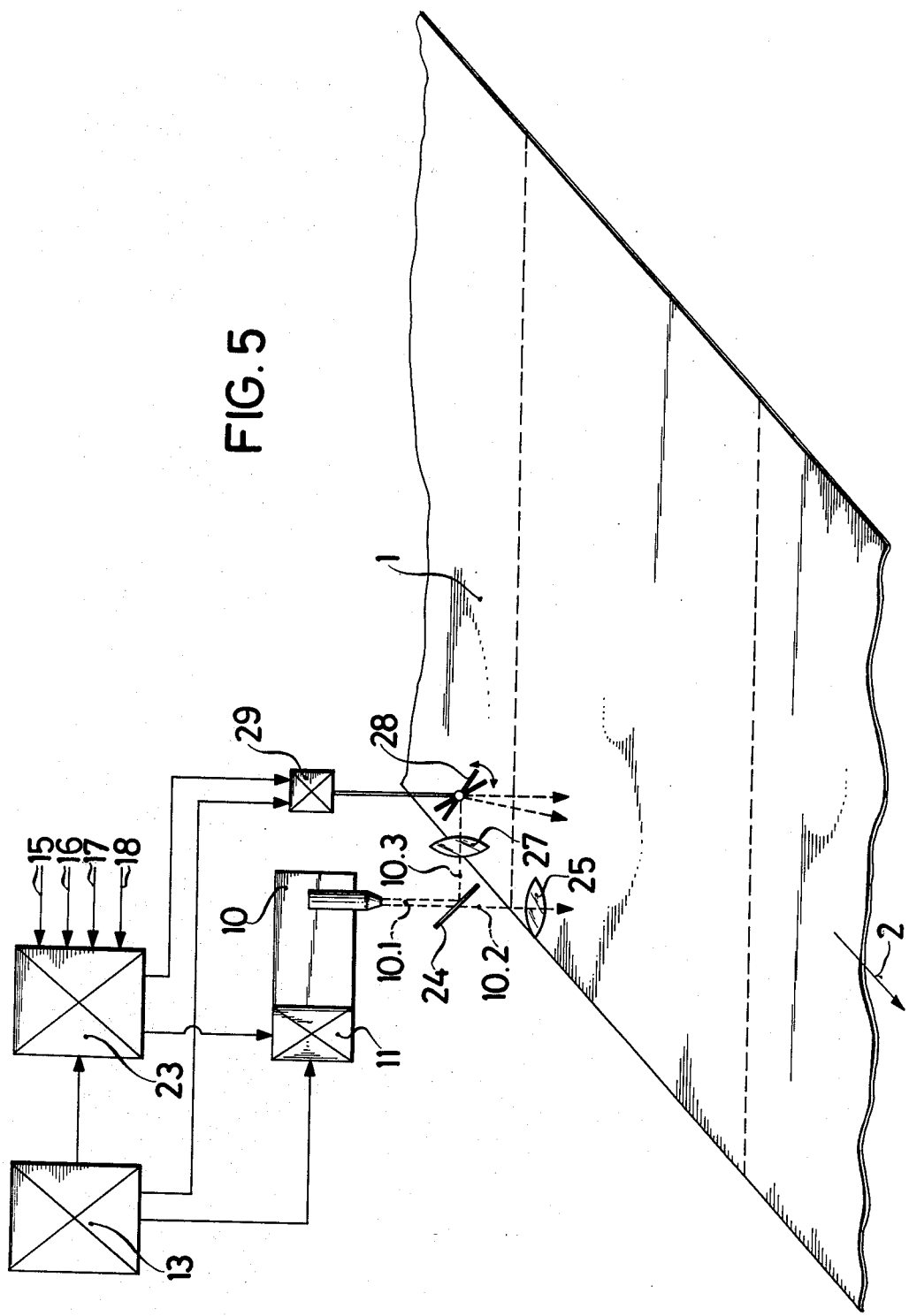

A somewhat modified embodiment of the arrangement of FIG. 4 is illustrated in FIG. 5. In FIG. 5 like reference numerals identify like elements as in FIG. 4. However, in FIG. 5 the rotating mirror system 26 is omitted and the beam portions (or rays) 10.2 and 10.3 of the split laser beam 10.1 are guided directly onto the surface of the advancing tape 1, so that the stripshaped indicia or markings are produced as a result of the advancement of the tape 1. In contradistinction to FIG. 4, the axis about which the mirror 28 is turnable via the drive 29 in FIG. 5, extends parallel to the direction 2 in which the tape 1 travels.

A particular advantage of the present invention resides in the fact that a sequence of laser light pulses is converted in a simple and cost-effective manner into a sequence of line-shaped parallel markings, of which the markings that are parallel to each other are located at one and the same transverse portion of the workpiece.

Another advantage of the invention is that the length of zones Z can be very short, if desired, in correspondence with the short length of the strip-shaped markings or indicia I (see FIG. 2) to be produced. This means that flaws or faults which closely follow one another in the tape 1 can be very precisely indicated by the markings which can be located at the same transverse position as the flaw that is being so marked.

Although the invention has been described and illustrated with respect to exemplary embodiments, it will be understood that it is succeptible of various modifications which are all intended to be encompassed within the scope of protection of the appended claims, such claims constituting the only measure of the invention.

I claim:

1. A method of applying indicia to a surface of a moving workpiece, comprising the steps of emitting a laser beam from a source; splitting the laser beam in two rays located in a common plane; deflecting the rays onto a surface of a workpiece which moves in a predetermined direction so as to form on the surface two parallel strip-shaped indicia which are located opposite one another but are spaced transversely of said predetermined direction; the step of emitting comprising directing the laser beam before splitting normal to the workpiece surface, intercepting the beam with a semipermeable mirror and splitting it into two parts one of which passes through the mirror and the other of which is reflected by the mirror; the step of deflecting comprising focusing the one part to produce one of said rays and thereafter directly guiding said one ray onto the workpiece surface, and focusing the other part to produce another of said rays, directing said other ray onto a rotatable mirror, and from there deflecting said other ray onto the workpiece surface; rotating said rotatable mirror through an angle dependent on predetermined information so that said other ray is spaced from said one ray by a distance corresponding to said information; and producing relative motion between said rays and said workpiece surface to form said parallel strip-shaped indicia spaced in accordance with said information.

2. A method as defined in claim 1, comprising the step of rotating the mirror about an axis of rotation which extends parallel to said direction.

3. In an arrangement for applying indicia to a surface of a moving workpiece, a combination comprising means for emitting a laser beam; means for splitting the laser beam in two rays located in a common plane; means for directing one of said rays onto a surface of a workpiece which moves in a predetermined direction; means for deflecting onto said surface the other one of said rays so as to form on the surface two parallel strip-shaped indicia which are located opposite one another but are spaced transversely of said predetermined direction; said means for splitting comprising a semi-permeable mirror positioned to intercept the beam and for passing one part of the beam corresponding to said one ray while refecting another part of the beam corresponding to said other ray in direction parallel to the workpiece surface, and an impermeable mirror positioned to intercept said other part of the beam and being turnable about an axis parallel to the workpiece surface; said impermeable mirror being rotated through an angle dependent on predetermined information so that said other part of the beam is spaced from said one part of the beam by a distance corresponding to said information; and means for producing relative motion between said parts of said beam and said workpiece surface to form said parallel strip-shaped indicia spaced in accordance with said information.

4. A combination as defined in claim 3; and further comprising means for turning said impermeable mirror about said axis.

5. A combination as defined in claim 3; including means for synchronizing said laser emitting means with rotation of said rotatable mirror and said deflecting means.

6. A combination as defined in claim 3, said means for deflecting comprising a mirror system mounted for rotation above the workpiece and having a periphery provided with identically sized mirror surfaces, said mirror system being rotated to produce said relative motion for forming said parallel strip-shaped indicia; means for turning said impermeable mirror about said axis; means for focusing and converting each of said parts into one of said rays ahead of said mirror system; and means for synchronizing said laser emitting means with rotation of said rotatable mirror and said deflecting means.

7. A method of applying indicia to a surface of a moving workpiece, comprising the steps of emitting a laser beam from a source; splitting the laser beam in two rays located in a common plane; deflecting the rays onto a surface of a workpiece which moves in a predetermined direction so as to form on the surface two parallel strip-shaped indicia which are located opposite one another but are spaced transversely of said predetermined direction; the step of emitting comprising directing the laser beam before splitting parallel to the workpiece surface, intercepting the beam with a semi-permeable mirror and splitting it into two parts one of which passes through the mirror and the other of which is reflected by the mirror; the step of deflecting comprising focusing the one part to produce one of said rays and thereafter directly guiding said one ray onto the workpiece surface, and focusing the other part to produce another of said rays, directing said other ray onto a rotatable mirror, and from there deflecting said other ray onto the workpiece surface; rotating said rotatable mirror through an angle dependent on predetermined information so that said other ray is spaced from said one ray by a distance corresponding to said information; and producing relative motion between said rays and said workpiece surface to form said parallel strip-shaped indicia spaced in accordance with said information.

8. A method as defined in claim 7, wherein the step of deflecting comprises further directing both of said rays onto a mirror surface of a mirror system rotating above the workpiece and from thence deflecting the rays onto the workpiece surface; said mirror system being rotated to produce said relative motion for forming said parallel strip-shaped indicia.

9. A method as defined in claim 7, wherein the step of deflecting comprises further directing both of said rays onto a mirror surface of a mirror system rotating above the workpiece and from thence deflecting the rays onto the workpiece surface, said mirror system being rotated to produce said relative motion for forming said parallel strip-shaped indicia; said rotatable mirror being rotated about an axis of rotation extending parallel to said direction; and synchronizing said laser beam from said source with rotation of said rotatable mirror and said step of deflecting said rays.

10. In an arrangement for applying indicia to a surface of a moving workpiece, a combination comprising means for emitting a laser beam; means for splitting the laser beam in two rays located in a common plane; means for deflecting the rays onto a surface of a workpiece which moves in a predetermined direction so as to form on the surface two parallel strip-shaped indicia which are located opposite one another but are spaced transversely of said predetermined direction; said means for splitting comprising a semi-permeable mirror positioned to intercept the beam and for passing one part of the beam while reflecting another part of the beam in direction parallel to the workpiece surface, and an impermeable mirror positioned to intercept said other part of the beam and being turnable about an axis normal to the workpiece surface; said impermeable mirror being rotated through an angle dependent on predetermined information so that said other part of the beam is spaced from said one part of the beam by a distance corresponding to said information; and means for producing relative motion between said parts of said beam and said workpiece surface to form said parallel strip-shaped indicia spaced in accordance with said information.

11. A combination as defined in claim 10, said means for deflecting comprising a mirror system mounted for rotation above the workpiece and having a periphery provided with identically sized mirror surfaces; said mirror system being rotated to produce said relative motion for forming said parallel strip-shaped indicia.

12. A combination as defined in claim 11; and further comprising means for focusing and converting each of said parts into one of said rays ahead of said mirror system.

* * * * *